United States Patent
Kim et al.

(10) Patent No.: US 9,246,813 B2
(45) Date of Patent: Jan. 26, 2016

(54) FLOW CONTROL NODE FOR MANAGING THROUGHPUT FAIRNESS OF A PLURALITY OF FLOWS, TRANSMISSION NODE, METHOD FOR CONTROLLING FLOW, AND METHOD FOR CONTROLLING TRANSMISSION RATE

(75) Inventors: Jongwon Kim, Gwangju (KR); Jae-Yong Yoo, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 312 days.

(21) Appl. No.: 13/703,784

(22) PCT Filed: Oct. 21, 2011

(86) PCT No.: PCT/KR2011/007891
§ 371 (c)(1),
(2), (4) Date: Dec. 12, 2012

(87) PCT Pub. No.: WO2012/053860
PCT Pub. Date: Apr. 26, 2012

(65) Prior Publication Data
US 2013/0088968 A1  Apr. 11, 2013

(30) Foreign Application Priority Data
Oct. 21, 2010 (KR) .................. 10-2010-0103028

(51) Int. Cl.
*H04L 12/26* (2006.01)
*H04L 12/801* (2013.01)
*H04L 12/835* (2013.01)

(52) U.S. Cl.
CPC ............... *H04L 47/10* (2013.01); *H04L 47/11* (2013.01); *H04L 47/30* (2013.01)

(58) Field of Classification Search
None
See application file for complete search history.

(56) References Cited

U.S. PATENT DOCUMENTS

| 2002/0168940 A1* | 11/2002 | Heijenk | H04W 74/06 455/41.1 |
| 2007/0268829 A1* | 11/2007 | Corwin | H04L 47/10 370/235 |
| 2011/0096674 A1* | 4/2011 | Dong | H04L 47/10 370/252 |

* cited by examiner

*Primary Examiner* — Yemane Mesfin
*Assistant Examiner* — Jeff Banthrongsack
(74) *Attorney, Agent, or Firm* — Nath, Goldberg & Meyer; Joshua B. Goldberg (57) ABSTRACT

According to one embodiment of the present invention, a multi-hop network system includes: a transmission node; a reception node; a router node; and a flow control node connected to all nodes within the multi-hop network system. The flow control node periodically receives flow monitoring information from at least one transmission node and evaluates whether the distributed state of the bandwidth of a network is fair. At this time, the flow control node sets a queue length threshold as transmission rate control information for fairly distributing the bandwidth of the network and transmits the set queue length threshold to at least one transmission node when unfairness has been detected. The transmission node sets the queue length threshold as a reference point for adjusting the transmission rate and performs the packet and/or link scheduling.

18 Claims, 5 Drawing Sheets

FLOW CONTROL NODE FOR MANAGING THROUGHPUT FAIRNESS OF A PLURALITY OF FLOWS, TRANSMISSION NODE, METHOD FOR CONTROLLING FLOW, AND METHOD FOR CONTROLLING TRANSMISSION RATE

This is a National Phase Application filed under 35 U.S.C. §371 as a national stage of International Application No. PCT/KR2011/007891, filed on Oct. 21, 2011, claiming the benefit from Korean Patent Application No. 10-2010-0103028 filed on Oct. 21, 2010, the content of each of which is hereby incorporated by reference in its entirety.

TECHNICAL FIELD

The present invention relates to a flow control node, a transmission node, a flow control method and a transmission rate control method for managing throughput fairness of a plurality of flows.

The present invention is derived from a study performed as a part of a senior researcher supporting project of the Ministry of Education, Science and Technology [Project management No. NN05260, Project title: Virtualized programmable wireless network test bed capable of repeated performance evaluation experiments].

BACKGROUND ART

IETF has standardized IEEE802.11s (multi-hop relay based on IEEE 802.11) as a protocol for enhancing transmission and reception efficiency with respect to coverage and energy of IEEE 802.11. In addition, in a similar way, it has also standardized IEEE802.16j employing the multi-hop relay of IEEE802.16.

Based on the multi-hop relay, signals can be transferred even outside the region of a base station through a relay station (RS), and a terminal within the region of the base station may set a path of high quality having a high-level adaptive modulation and coding scheme through the relay station, and thus system capacity can be improved using the same wireless resources.

However, since such a multi-hop situation has link dependency among adjacent routing nodes due to sharing of wireless channels for transmitting data, throughput starvation occurs, in which throughputs of some flows are extremely lowered.

Furthermore, probability of congestion occurring is high in a network which frequently changes depending on a wireless channel state. Accordingly, it is impossible to flexibly adjust and improve fairness in a conventional method of adjusting a transmission rate by monitoring only own flow state.

For example, a distributed scheduling technique for controlling a transmission rate among distributed end points has been proposed in the prior art in order to prevent the throughput starvation.

In such a distributed scheduling technique, an end node directly or indirectly monitors a state of a network path through which its own flow passes, instead of information regarding the entire network, and determines a transmission rate based on the monitored information in order to control its own transmission rate. Particularly, a flow having a low throughput tries to obtain higher throughput by continuously increasing its own transmission rate in order to increase fairness.

Accordingly, the distributed scheduling technique is a problem of determining a sequence of communication with adjacent nodes in the nodes configuring the network.

At this point, the nodes try to increase fairness by solving the problem of throughput starvation in a method of monitoring states of geographically close nodes and granting a higher communication priority to a flow which obtains a low throughput based on the monitored states.

However, such a method does not work based on the information regarding the entire network. Accordingly, the determination is wrong in many cases due to limited amount of information, and thus there is a problem in that a high fairness is not demonstrated.

DISCLOSURE

Technical Problem

The present invention is conceived to solve the above problems, and an aspect of the present invention is to provide a flow control node, a transmission node, a flow control method, and a transmission rate control method for managing throughput fairness of a plurality of flows, which can adjust and improve throughput fairness of the plurality of flows in a wireless multi-hop network environment.

Technical Solution

One aspect of the invention provides a flow control node. The flow control node is connected to all nodes configuring a network and includes: a flow state collection unit which receives flow monitoring information from at least one transmission node included in the network; a fairness evaluation unit which evaluates whether a bandwidth distribution state of the network is fair based on the flow monitoring information; and a transmission rate adjustment unit which transmits transmission rate control information for fairly distributing bandwidth of the network to the at least one transmission node, if the bandwidth distribution state is evaluated as unfair.

Another aspect of the present invention provides a transmission node, which includes: a transmission rate control unit which receives transmission rate control information for fairly distributing bandwidth of a network from a flow control node, the flow control node being connected to all nodes configuring the network and evaluating whether a bandwidth distribution state of the network is fair; and a backpressure scheduler unit which performs packet and/or link scheduling in consideration of adjacent nodes based on the transmission rate control information.

A further aspect of the present invention provides a flow control method, which includes: receiving flow monitoring information from at least one transmission node included in a network, by a flow control node connected to all nodes configuring the network; evaluating fairness of a bandwidth distribution state of the network based on the flow monitoring information; and determining transmission rate control information for fairly distributing bandwidth of the network and transmitting the transmission rate control information to at least one transmission node, if the bandwidth distribution state is evaluated as unfair.

Yet another aspect of the present invention provides a transmission rate control method performed by a transmission node present on a network. The transmission rate control method includes: receiving, by the transmission node, transmission rate control information for fairly distributing bandwidth of the network from a flow control node, the flow control node being connected to all nodes configuring the network and evaluating whether a bandwidth distribution state of the network is fair; and performing packet and/or link scheduling in consideration of adjacent nodes based on the transmission rate control information in a backpressure scheduling method.

Advantageous Effects

According to embodiments of the present invention, a flow control node positioned at the center collects network state information obtained through flow monitoring and adjusts a transmission rate of a transmission node based on the collected information. Accordingly, high throughput fairness may be obtained among a plurality of flows in a variety of network environments, such as a multi-hop network having at least one routing node between a transmission node and a reception node, a network generating a lot of congestion or frequently changed depending on the wireless channel state, and the like.

In addition, a backpressure scheduler capable of optimizing throughput of a flow is inserted into a lower layer in order to prevent loss of network bandwidth such as packet queue loss, and transmission nodes may share bandwidth resources of a network by adjusting transmission rates of flows.

BEST MODE

Exemplary embodiments of the present invention will now be described in detail with reference to the accompanying drawings in such a way that the present invention can be readily carried out by those skilled in the art. Detailed descriptions of well-known functions and structures incorporated herein may be omitted to avoid obscuring the subject matter of the present invention. Furthermore, in the drawings illustrating the embodiments of the invention, elements having like functions will be denoted by like reference numerals and details thereon will not be repeated.

Now, a flow control node, a transmission node, a flow control method and a transmission rate control method for managing throughput fairness of a plurality of flows according to embodiments of the present invention will be described with reference to the drawings.

Figure 1:
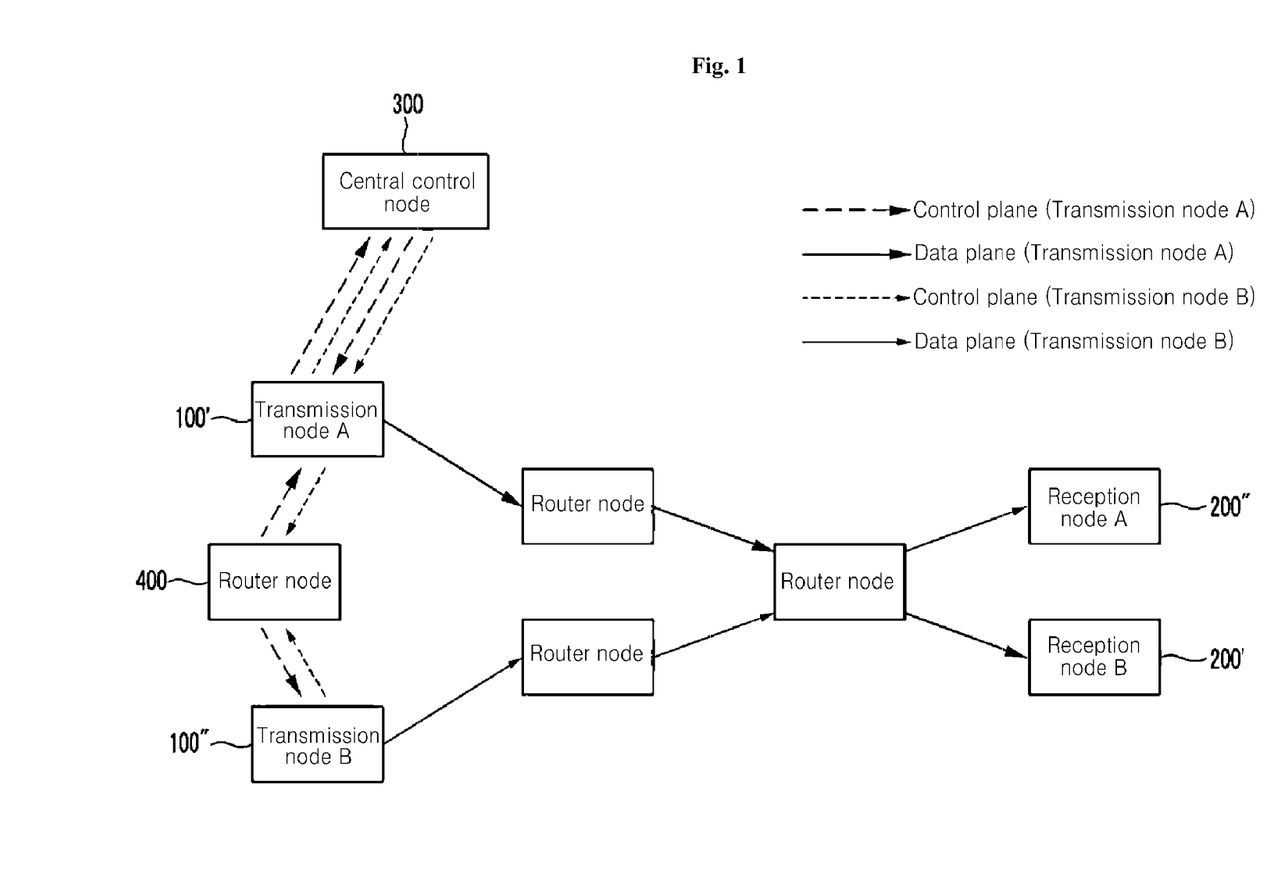
FIG. 1 is a view showing the configuration of a wireless multi-hop network system according to one embodiment of the present invention.

FIG. 1 is a view showing the configuration of a wireless multi-hop network system according to one embodiment of the present invention.

Referring to FIG. 1, a wireless multi-hop network system includes transmission nodes 100', 100", reception nodes 200', 200", and a flow control node 300.

At this point, a plurality of router nodes 400 functioning as a relay is positioned between the transmission nodes 100', 100" and the reception nodes 200', 200".

In addition, a wireless multi-hop network is divided into a control plane network and a data plane network.

Here, all of the nodes configuring the wireless multi-hop network, i.e., the transmission nodes 100', 100", the reception nodes 200', 200" and the router nodes 400, are connected to the flow control node 300 through the control plane network. For example, transmission node A 100' is directly connected to the flow control node 300 through the control plane network. The control plane network of transmission node B 100" is connected to transmission node A 100' via the router node 400 and connected to the flow control node 300 via transmission node A 100'.

Such a control plane network is used to transmit and receive flow monitoring information and transmission rate control information for fairly distributing bandwidth of the network among the transmission nodes 100', 100" and the flow control node 300.

The data plane network is used to transmit and receive traffic and signaling packets between the transmission nodes 100', 100" and the reception nodes 200', 200".

The control flow node 300 receives flow monitoring information of each transmission node 100', 100" from one ore more transmission nodes 100', 100" through the control plane network. The control flow node 300 confirms whether respective flows fairly share the network bandwidth based on the flow monitoring information.

If it is determined that the network bandwidth is unfairly distributed, the flow control node 300 adjusts the unfairly distributed network bandwidth to be fair by lowering the transmission rates of flows having a relatively high throughput.

Here, the throughput is an amount of digital data transferred per unit time from a certain node to another node on the network.

At this point, the transmission rate is adjusted by adjusting queue length thresholds of the transmission nodes 100', 100".

Then, the configuration of the transmission nodes 100', 100" and the flow control node 300, which are main constitutional components related to throughput control of a plurality of flows, will be described in further detail.

Figure 2:
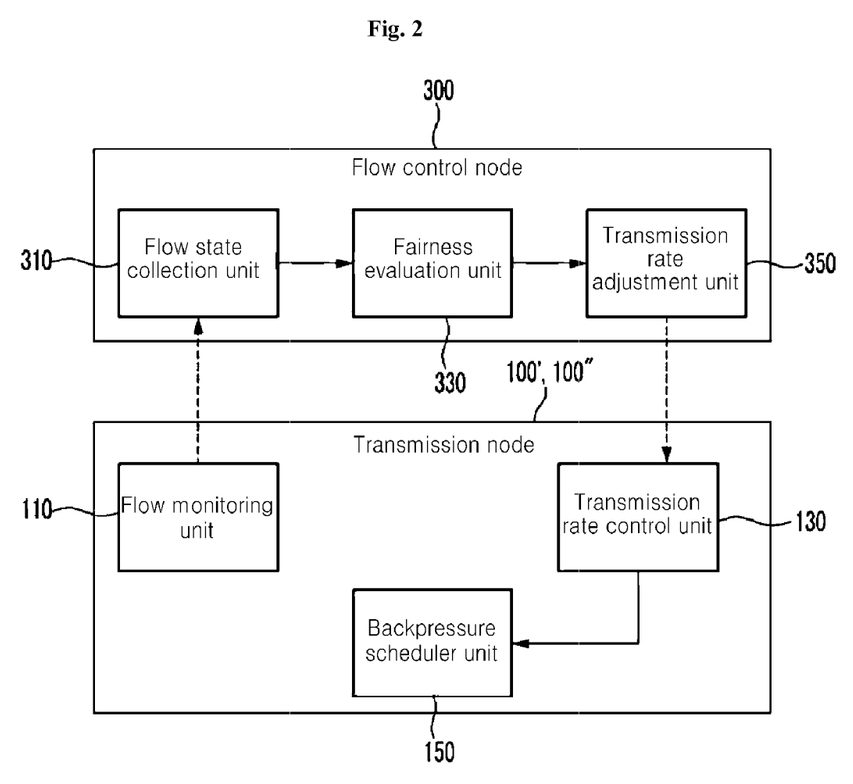
FIG. 2 is a view showing a connection relation of the constitutional components of a transmission node and a flow control node according to one embodiment of the present invention.

FIG. 2 is a view showing a connection relation among the constitutional components of a transmission node and a flow control node according to one embodiment of the present invention.

Referring to FIG. 2, each transmission node 100', 100" includes a flow monitoring unit 110, a transmission rate control unit 130, and a backpressure scheduler unit 150.

The flow monitoring unit 110 periodically monitors one or more of flow states thereof and transmits flow monitoring information to the flow control node 300.

Here, the flow monitoring information includes one or more pieces of flow state information and current throughputs of one or more flows.

At this point, the flow state information is information requested by the fairness evaluation index of the flow control node 300, and different information is used for different fairness evaluation indexes.

For example, the proportional fairness index for evaluating a throughput sharing state with respect to a state of a network path uses link quality as flow state information, and the Jain's fairness index for evaluating absolute fairness uses network bandwidth as flow state information.

The transmission rate control unit 130 receives the transmission rate control information from the flow control node 300. Here, the flow control node 300 determines the transmission rate control information according to a result of evaluating fairness of the bandwidth distribution state of a network based on the flow monitoring information of the transmission nodes 100', 100", and the queue length threshold is used as the transmission rate control information.

The transmission rate control unit 130 receives the queue length threshold from the flow control node 300 and updates its own transmission queue length threshold with the received queue length threshold. Then, the transmission rate control unit 130 transmits the updated queue length threshold to the backpressure scheduler unit 150.

The backpressure scheduler unit 150 performs packet and/or link scheduling in consideration of adjacent nodes based on the transmission rate control information, i.e., the queue length threshold.

The backpressure scheduler unit 150 is a component for solving packet and scheduling problems occurring when a plurality of flows pass through one node. Each node has a queue for each flow when a plurality of flows passes through one node. At this point, the packet scheduling is a problem of determining a queue of a flow that will be serviced first. As for the link scheduling, since a channel of a wireless network is shared among adjacent nodes, a packet can be transmitted on a link at a time. The link scheduling is a problem of determining a link that will be activated first to transmit the packet.

The backpressure scheduler unit 150 defines a backpressure value by calculating a difference of flow queue length corresponding to one hop and services a queue having the highest backpressure value first among the queues of the flows. In link scheduling, a link having the highest backpressure value is scheduled first in a similar manner.

Here, the backpressure scheduler unit 150 sets the queue length of its own flow based on the queue length threshold received from the transmission rate control unit 130. Since the queue length threshold is a variable determined by the flow control node 300, the transmission rate is adjusted to a transmission rate that can obtain an optimized throughput by adjusting the queue length threshold.

That is, the transmission rate is adjusted so that the queue length of the current flow may satisfy the queue length threshold by comparing the queue length of the current flow and the queue length threshold. That is, the backpressure scheduler unit 150 should maintain its own queue length as large as the queue length threshold. Accordingly, the queue length of each flow is monitored at regular intervals, and if the queue length is smaller than the queue length threshold, the transmission rate is adjusted to transmit as many packets as the difference of the queue length.

Meanwhile, the flow control node 300 includes a flow state collection unit 310, a fairness evaluation unit 330, and a transmission rate adjustment unit 350.

The flow state collection unit 310 periodically receives flow monitoring information from the flow monitoring units 110 of the transmission nodes 100', 100".

The fairness evaluation unit 330 evaluates whether a bandwidth distribution state of a network is fair based on the flow monitoring information received by the flow state collection unit 310. At this point, the flow monitoring information includes flow state information and flow throughput of each flow.

Accordingly, the fairness evaluation unit 330 evaluates how fairly the current flows use throughputs by comparing a fairness evaluation reference value, which is calculated according to a fairness index predetermined based on the flow state information, with the throughput of the flow.

Here, the fairness evaluation unit 330 sets the fairness evaluation reference value by calculating a throughput target value that a corresponding flow must achieve, based on the flow state information according to the predetermined fairness index. The fairness evaluation reference value is calculated as a single numerical value, and a reference function for deriving the fairness evaluation reference value should be convex.

At this point, a variety of indexes can be used as the fairness evaluation index. For example, although a Jain's fairness index, a proportional fairness index, or a max-min fairness index can be used, the invention is not limited thereto, and the fairness evaluation index can be selected from a variety of fairness indexes.

The fairness evaluation reference value is a reference value for evaluating whether the network bandwidth is fairly distributed. It is calculated according to a different method depending on the fairness index, and two embodiments of the proportional fairness index and the Jain's fairness index will be described below.

First, according to one embodiment using the proportional fairness index, the flow state information received by the flow state collection unit 310 includes link quality.

The fairness evaluation unit 330 calculates a throughput target value that a flow must achieve from information regarding the link quality received by the flow state collection unit 310, as shown in Equation 1.

$$x_r = \frac{1}{\sum_{j \in A_{s(r)}} (r)C(j,r)\lambda_j} \quad \text{[Equation 1]}$$

Here, $A_{s(r)}(r)$ denotes a set of all nodes present in the path of flow r. $\lambda_j$ denotes throughputs of flows other than flow r present in node j. $C(j,r)$ denotes link quality when flow r passes through node j, calculated as shown in Equation 2.

$$C(j,r) = \frac{1}{c_{ii}(j,r)} + \frac{1}{c_{io}(j,r)} \quad \text{[Equation 2]}$$

Here, $c_{ji}(j,r)$ and $c_{jo}(j,r)$ denote capacities of input and out links of flow r at node j.

Then, the fairness evaluation unit 330 calculates a fairness evaluation reference value by adding together the throughput target values of the respective flows calculated through Equation 1, as shown in Equation 2.

$$\max_{x \geq 0} \sum_{r \in R} \log(x_r) \quad \text{[Equation 3]}$$

Here, x is a vector of $x_r$ of Equation 1 and denotes a bandwidth of flow r.

Next, according to one embodiment using Jain's fairness index, the flow state information received by the flow state collection unit 310 includes network bandwidth.

At this point, the fairness evaluation unit 330 fairly distributes the network bandwidth to each flow and calculates a throughput target value of each flow, and then the fairness evaluation unit 330 calculates a fairness evaluation reference value by adding together the throughput target values of the respective flows.

If a result of the evaluation of the fairness evaluation unit 330 is evaluated as unfair, the transmission rate adjustment unit 350 determines transmission rate control information, i.e., a queue length threshold, for fairly distributing the network bandwidth and transmits the transmission rate control information to the transmission rate control units 130 of the transmission nodes 100', 100".

At this point, the transmission rate adjustment unit 350 decreases the queue length threshold for a flow having a larger flow throughput than the fairness evaluation reference value and increases the queue length threshold for a flow having a flow throughput smaller than the fairness evaluation reference value.

Specifically, the transmission rate adjustment unit 350 increases or decreases the queue length threshold by a difference between the current flow throughput received by the flow state collection unit 310 and the throughput target value calculated by the fairness evaluation unit 330.

That is, the queue length threshold for a flow having a larger flow throughput than the fairness evaluation reference value is decreased by the difference between the current flow throughput and the throughput target value of a corresponding flow. In addition, the queue length threshold for a flow having a smaller flow throughput than the fairness evaluation reference value is increased by the difference between the current flow throughput and the throughput target value of a corresponding flow.

Then, a series of operations for flow control and transmission rate control in such a multi-hop network will be described in detail. At this point, constitutional components having like functions will be denoted by like reference numerals of FIGS. 1 and 2.

Figure 3:
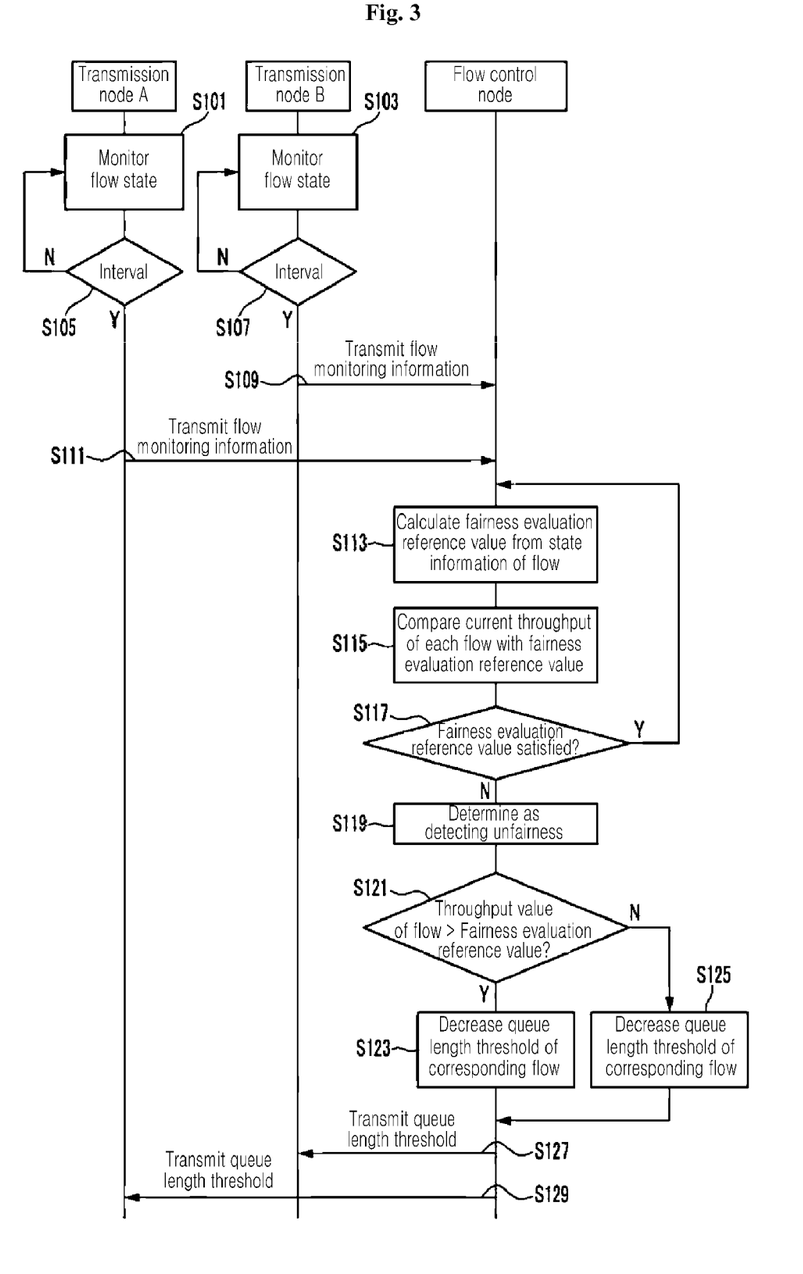
FIG. 3 is a flowchart illustrating a control flow method according to one embodiment of the present invention.

FIG. 3 is a flowchart illustrating a control flow method according to one embodiment of the present invention.

Referring to FIG. 3, the flow monitoring unit 110 of each transmission node 100', 100" monitors its own flow state 101, 103. Then, if a predefined interval arrives 105, 107, the flow monitoring unit 110 transmits flow monitoring information to the flow state collection unit 310 of the flow control node 300 (in S109, S111).

Then, the fairness evaluation unit 330 of the flow control node 300 calculates a fairness evaluation reference value according to a predetermined fairness index based on the flow state information contained in the flow monitoring information received in S109 and/or S111 (in S113).

At this point, the fairness evaluation reference value is calculated according to a different method depending on the fairness evaluation index.

Here, according to one embodiment using a proportional fairness index, the flow state information includes link quality. Accordingly, the fairness evaluation unit 330 calculates a throughput target value for each flow collected by the flow state collection unit 310, using throughputs of all nodes present in a network path of a certain flow and throughputs of adjacent flows other than a certain flow present in each node. Then, the fairness evaluation unit 330 calculates a fairness evaluation reference value by adding the respective throughput target values together.

In addition, according to another embodiment using Jain's fairness index, the flow state information contains network bandwidth.

Accordingly, the fairness evaluation unit 330 calculates a throughput target value of each flow collected by the flow state collection unit 310, based on the network bandwidth. Then, the fairness evaluation unit 330 calculates a fairness evaluation reference value by adding the respective throughput target values together.

Then, the fairness evaluation unit 330 of the flow control node 300 compares the throughput contained in the flow monitoring information received in S109 and/or S111 with the fairness evaluation reference value calculated in S113 S115 and determines whether the flow throughput satisfies the fairness evaluation reference value (in S117).

At this point, if unfairness is detected (in S119), the transmission rate adjustment unit 350 of the flow control node 300 determines whether the flow throughput received in S109 and/or S111 is larger than the fairness evaluation reference value calculated in S113 (in S121).

If it is determined that the flow throughput is larger than the fairness evaluation reference value in S121, the transmission rate adjustment unit 350 of the flow control node 300 decreases the queue length threshold of a corresponding flow (in S123).

In addition, if it is determined that the flow throughput is smaller than the fairness evaluation reference value in S121, the transmission rate adjustment unit 350 of the flow control node 300 increases the queue length threshold of a corresponding flow (in S125).

Then, the transmission rate adjustment unit 350 of the flow control node 300 transmits the queue length threshold increased or decreased in S123 or S125 to a corresponding transmission node 100', 100" (in S127 and S129).

Figure 4:
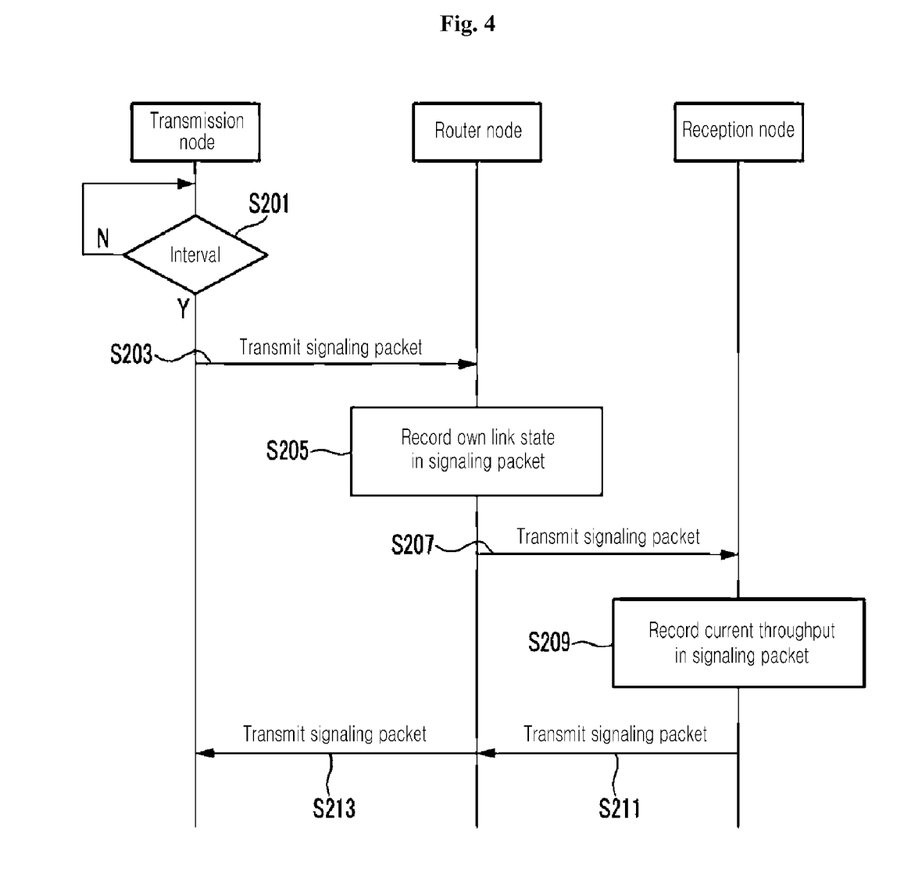
FIG. 4 is a flowchart illustrating a flow monitoring procedure according to one embodiment of the present invention.

FIG. 4 is a flowchart illustrating a flow monitoring procedure according to one embodiment of the present invention.

Referring to FIG. 4, if a predefined interval arrives (in S201), the flow monitoring unit 110 of the transmission node 100', 100" transmits a signaling packet to the router node 400 (in S203).

Then, the router 400 records its own link state in the signaling packet (in S205) and transmits the signaling packet to the reception node 200 (in S207).

The reception node 200 records current flow throughput in the signaling packet (in S209) and transmits the signaling packet to the router node 400 (in S211), and the router node 400 transmits the signaling packet received from the reception node 200 to the transmission node 100', 100" (in S213).

As describe above, the flow monitoring unit 110 of the transmission node 100' and 100" periodically collects flow state information and flow throughput present in its flow path.

Figure 5:
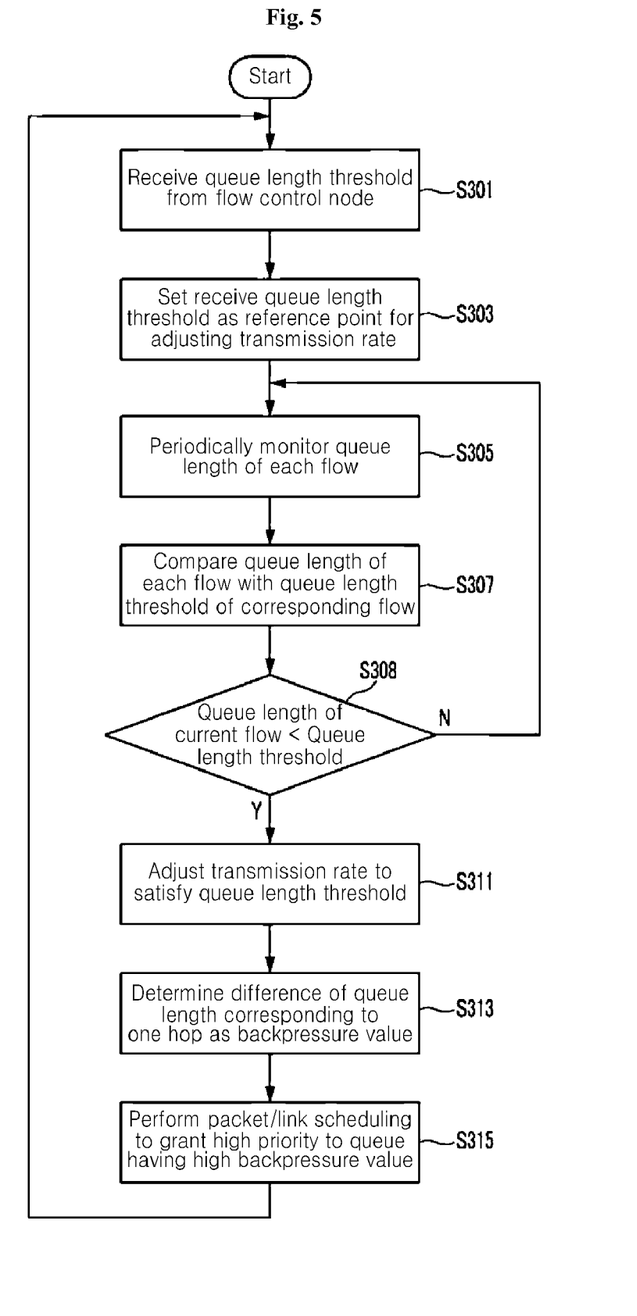
FIG. 5 is a flowchart illustrating a transmission rate control method according to one embodiment of the present invention.

FIG. 5 is a flowchart illustrating a transmission rate control method according to one embodiment of the present invention, which shows operation of transmission nodes 100', 100".

Referring to FIG. 5, the transmission rate control unit 130 of each transmission node 100', 100" receives a queue length threshold from the flow control node 300 (in S301) and sets the queue length threshold as a reference point for adjusting a transmission rate (in S303).

The backpressure scheduler unit 150 periodically monitors queue length of each flow (in S305). Then, the backpressure scheduler unit 150 compares the queue length threshold received from the transmission rate control unit 130 with queue length of a corresponding flow (in S307) and determines whether the queue length of the current flow is smaller than the queue length threshold (in S309).

At this point, if the queue length of the current flow is equal to the queue length threshold, the backpressure scheduler unit 150 returns to S305.

However, if the queue length of the current flow is smaller than the queue length threshold, the backpressure scheduler unit 150 adjusts the transmission rate to satisfy the queue length threshold (in S311).

The backpressure scheduler unit 150 determines a difference of queue length corresponding to one hop as a backpressure value S313 and performs packet/link scheduling which grants a high priority to a queue having the largest backpressure value (in S315).

Although some embodiments have been described with reference to the drawings, it should be understood that the present invention is not limited to these embodiments, and that various modifications, changes, and alterations can be made without departing from the spirit and scope of the invention. Therefore, the scope of the invention should be limited only by the accompanying claims and equivalents thereof.

The invention claimed is:

1. A wireless multi-hop network system, the system comprising:
at least one transmission node;
a flow control node, wherein the flow control node is configured to:
receive flow monitoring information from the at least one transmission node included in the network;
evaluate whether a bandwidth distribution state of the network is fair based on the flow monitoring information;
transmit transmission rate control information for fairly distributing bandwidth of the network to the at least one transmission node, if the bandwidth distribution state is evaluated as unfair; and
the transmission node configured to:
receive transmission rate control information for fairly distributing bandwidth of a network from the flow control node, the flow control node being connected to all nodes configuring the network and evaluating whether a bandwidth distribution state of the network is fair, and perform packet and/or link scheduling in consideration of adjacent nodes based on the transmission rate control information.

2. The wireless multi-hop network system according to claim 1, wherein the transmission rate control information is a queue length threshold of the transmission node.

3. The wireless multi-hop network system flow control node according to claim 1, wherein the flow monitoring information contains flow state information and flow throughput, and the flow control node evaluates whether the bandwidth distribution state of the network is fair by calculating a fairness evaluation reference value according to a predetermined fairness index from the flow state information and evaluates fairness of the bandwidth distribution state by comparing the fairness evaluation reference value with the flow throughput.

4. The wireless multi-hop network system according to claim 3, wherein the flow control node evaluates whether the bandwidth distribution state of the network is fair by calculating a throughput target value that a flow must achieve from the flow state information for all the flow monitoring information received, and calculates the fairness evaluation reference value by adding the respective throughput target values together.

5. The wireless multi-hop network system according to claim 4, wherein the flow state information contains link quality of the flow, and the flow control node evaluates whether the bandwidth distribution state of the network is fair by calculating and summing the respective throughput target values of all the flow monitoring information received from the link quality, using throughputs of all nodes present in a network path of the flow and throughputs of flows other than the flow present in the respective nodes, and sets the added value as the fairness evaluation reference value.

6. The wireless multi-hop network system according to claim 4, wherein the flow state information contains network bandwidth, and the flow control node evaluates whether the bandwidth distribution state of the network is fair by calculating the throughput target value based on the network bandwidth and calculating the fairness evaluation reference value by adding together the respective throughput target values of all the flow monitoring information received.

7. The wireless multi-hop network system according to claim 3, wherein the flow monitoring information contains flow state information and flow throughput, and the transmission rate control information is decreased over a queue length threshold of a flow having a flow throughput larger than the fairness evaluation reference value, increased over a queue length threshold of a flow having a flow throughput smaller than the fairness evaluation reference value, and the queue length threshold is transmitted to a corresponding transmission node.

8. The wireless multi-hop network system according to claim 7, wherein the flow control node evaluates whether the bandwidth distribution state of the network is fair by calculating a throughput target value that a flow must achieve from the flow state information for all the flow monitoring information received, and calculating the fairness evaluation reference value by summing the respective throughput target values, and the transmission rate control information is decreased over the queue length threshold of the flow having a larger flow throughput than the fairness evaluation reference value by a difference between a current flow throughput and a throughput target value of a corresponding flow, and increased over the queue length threshold of the flow having the smaller flow throughput than the fairness evaluation reference value by a difference between the current flow throughput and a throughput target value of a corresponding flow.

9. The wireless multi-hop network system according to claim 1, the transmission node is further configured to periodically monitor one or more of own flow states thereof and transmit flow monitoring information to the flow control node, wherein the transmission rate control information is determined depending on a result of evaluating fairness of a bandwidth distribution state of the network based on the flow monitoring information of all transmission nodes present in the network.

10. The wireless multi-hop network system according to claim 9, wherein the periodic monitoring includes transmitting a signaling packet if a predefined interval arrives and receiving a signaling packet containing throughput and link information from a reception node, the reception node records the throughput, and router nodes present in a path between the transmission node and the reception node record the link information.

11. The wireless multi-hop network system according to claim 1, wherein the transmission rate control information contains a queue length threshold of the transmission node, and the transmission rate control information sets the queue length threshold received from the flow control node as a reference point for adjusting a transmission rate.

12. The wireless multi-hop network system according to claim 11, wherein the packet and/or link scheduling adjusts a transmission rate so that a queue length of a current flow satisfies the queue length threshold by comparing the queue length of the current flow with the queue length threshold.

13. A flow control method comprising:
monitoring a flow state of at least one transmission node by receiving flow monitoring information from each transmission node and transmitting flow monitoring information to a flow control node connected to all nodes configuring a network;

receiving the flow monitoring information from the at least one transmission node included in the network, by the flow control node;

evaluating fairness of a bandwidth distribution state of the network in the flow control node based on the received flow monitoring information;

determining transmission rate control information for fairly distributing bandwidth of the network and transmitting the transmission rate control information to at least one transmission node, if the bandwidth distribution state is evaluated as unfair; and performing packet and/or link scheduling in consideration of adjacent nodes based on the transmission rate control information.

14. The flow control method according to claim 13, wherein each of the steps comprises receiving the flow monitoring information containing flow state information and flow throughput, and the evaluating fairness of a bandwidth distribution state of the network comprises:

calculating a fairness evaluation reference value according to a predetermined fairness index from the flow state information; and evaluating the fairness of the bandwidth distribution state by comparing the fairness evaluation reference value with the flow throughput.

15. The flow control method according to claim 14, wherein the flow state information contains link quality of a flow, and the evaluating the fairness of a bandwidth distribution state comprises:

calculating throughputs of all nodes in a network path of the flow from the link quality;

calculating throughputs of flows other than the flow for every node;

calculating a throughput target value of the flow that the flow must achieve, using the throughputs of all the nodes and the throughputs of the flows other than the flow; and calculating the throughput target value of the flow for all the flows collected and summing the target values together as the fairness evaluation reference value.

16. The flow control method according to claim 14, wherein the flow state information contains network bandwidth, and the method comprises:

calculating a throughput target value of a flow that the flow must achieve, based on the network bandwidth;

calculating throughput target values for all nodes in a network path of the flow; and calculating the fairness evaluation reference value by summing the throughput target values of all the respective nodes.

17. The flow control method according to claim 15, comprising, if the throughputs of the flows do not satisfy the fairness evaluation reference value:

decreasing a queue length threshold of a flow having a larger flow throughput than the fairness evaluation reference value;

increasing a queue length threshold of a flow having a flow throughput smaller than the fairness evaluation reference value; and transmitting the increased or decreased queue length threshold to a corresponding transmission node.

18. The flow control method according to claim 17, wherein the decreasing a queue length threshold comprises decreasing the queue length threshold by a difference between a current flow throughput and a throughput target value of a corresponding flow, and the increasing a queue length comprises increasing the queue length threshold by a difference between the current flow throughput and a throughput target value of a corresponding flow.

* * * * *